(12) United States Patent
Ngo et al.

(10) Patent No.: US 8,681,741 B1
(45) Date of Patent: Mar. 25, 2014

(54) AUTONOMOUS HYBRID WLAN/GPS LOCATION SELF-AWARENESS

(75) Inventors: Terry FK Khan Ngo, Bellevue, WA (US); Timothy McCarthy, Arlington Heights, IL (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 13/044,408

(22) Filed: Mar. 9, 2011

Related U.S. Application Data

(63) Continuation-in-part of application No. 12/840,155, filed on Jul. 20, 2010.

(60) Provisional application No. 61/332,640, filed on May 7, 2010.

(51) Int. Cl.
*H04W 4/00* (2009.01)

(52) U.S. Cl.
USPC .......................................................... 370/331

(58) Field of Classification Search
USPC .............. 370/310, 310.2, 312, 313, 324, 332, 370/334, 338, 351; 455/456.1, 436, 440, 455/456.3, 437
See application file for complete search history.

(56) References Cited

U.S. PATENT DOCUMENTS

| | | | |
|---|---|---|---|
| 6,108,558 A | 8/2000 | Vanderspool | |
| 6,801,782 B2 | 10/2004 | McCrady et al. | |
| 7,057,557 B2 | 6/2006 | Lee | |
| 7,065,369 B2 | 6/2006 | Tang et al. | |
| 7,574,216 B2 | 8/2009 | Leitch et al. | |
| 7,800,531 B2 | 9/2010 | Wang et al. | |
| 7,877,100 B2 | 1/2011 | Rick et al. | |
| 8,026,850 B2 | 9/2011 | Seong et al. | |
| 8,184,038 B2 | 5/2012 | Ekbal et al. | |
| 8,233,457 B1 | 7/2012 | Chen et al. | |
| 8,335,173 B2 | 12/2012 | Hart et al. | |
| 8,370,629 B1 | 2/2013 | Ngo et al. | |
| 2002/0194266 A1 | 12/2002 | Brebner et al. | |
| 2003/0103475 A1 | 6/2003 | Heppe et al. | |
| 2003/0118015 A1* | 6/2003 | Gunnarsson et al. | 370/389 |
| 2005/0124319 A1 | 6/2005 | Williams et al. | |
| 2005/0124355 A1 | 6/2005 | Cromer et al. | |
| 2006/0052115 A1 | 3/2006 | Khushu | |
| 2006/0148486 A1* | 7/2006 | Kim et al. | 455/456.1 |
| 2007/0025296 A1* | 2/2007 | Jung et al. | 370/331 |

(Continued)

FOREIGN PATENT DOCUMENTS

| | | | |
|---|---|---|---|
| EP | 0320913 A2 | 6/1989 | |
| EP | 1253437 A2 | 10/2002 | |
| EP | 1587255 A1 | 10/2005 | |
| WO | WO 2005/006593 A1 | 1/2005 | |

*Primary Examiner* — Anh Ngoc Nguyen
(74) *Attorney, Agent, or Firm* — Mahamedi Paradice Kreisman LLP

(57) ABSTRACT

A system and method are disclosed for providing collective sharing and learning of location information in a network, specifically by enabling wireless devices to become self-aware of their location by leveraging the presence of hybrid WLAN/GPS devices that are inherently location self-aware. Self-aware network devices are enabled to self-determine and maintain their own location awareness without the need for a GPS receiver, and using hybrid WLAN/GPS devices to assist WLAN-only devices in becoming location self-aware. Additionally, the method includes pass-by autonomous exchange of location information between network devices, and avoidance of the need to associate by bursting the location information in beacon and probe request/response packets. The system and method also provides for sharing of trusted location data.

24 Claims, 9 Drawing Sheets

(56) References Cited

U.S. PATENT DOCUMENTS

| | | |
|---|---|---|
| 2007/0121560 A1 | 5/2007 | Edge |
| 2008/0109885 A1 | 5/2008 | Sim et al. |
| 2008/0291883 A1 | 11/2008 | Seok |
| 2009/0079622 A1 | 3/2009 | Seshadri et al. |
| 2009/0121927 A1 | 5/2009 | Moshfeghi |
| 2009/0224967 A1 | 9/2009 | Wang et al. |
| 2010/0135178 A1 | 6/2010 | Aggarwal et al. |
| 2012/0269170 A1 | 10/2012 | Chen et al. |

\* cited by examiner

AUTONOMOUS HYBRID WLAN/GPS LOCATION SELF-AWARENESS

CROSS REFERENCE TO RELATED APPLICATION

This application is a Continuation-in-Part (CIP) application to U.S. application Ser. No. 12/840,155, filed Jul. 20, 2010, entitled, "MANAGEMENT-PACKET COMMUNICATIONS OF GPS SATELLITE POSITIONS", which is hereby incorporated by reference in its entirety, and which further claims the benefit of the priority date of provisional application Ser. No. 61/332,640, filed May 7, 2010; Also incorporated by reference is related application, U.S. application Ser. No. 12/553,757, entitled, "SYNCHRONIZATION-FREE STATION LOCATOR IN WIRELESS NETWORK", which is hereby incorporated by reference in its entirety.

TECHNICAL FIELD

The Specification describes embodiments that generally relates to providing collective sharing and learning of location information within a network, specifically by enabling wireless devices to become self-aware of their location by leveraging the presence of hybrid WLAN/GPS devices that are inherently location self-aware.

BACKGROUND

The reception of global positioning system (GPS) satellite position data may be problematic and may negatively impact the performance of GPS receiver. The conventional approach to using global positioning system (GPS) satellites to determine a receiver's position requires the receiver to download navigation messages from four or more visible satellites, extract the broadcast ephemerides for each satellite from the navigation messages, and utilize this ephemeris data to compute the position of the satellites in the ECEF (earth-centered earth-fixed) coordinate system at a specific time. The broadcast ephemerides for each satellite are provided in a frame of data that takes about 30 seconds to send/receive. The broadcast ephemerides are valid for a period of four hours starting from the time the satellite starts to broadcast the navigation data. A control station uploads the data to the satellite less frequently, usually a couple of times a day. After a four-hour period, the receiver has to again download the latest broadcast ephemerides.

It is desirable for a Wireless Local Access Network (WLAN) device to determine its location without the need for its own GPS receiver or in the absence of a GPS satellite signal. In addition, it is desirable to easily associate IP address of a WLAN device with its location.

For WLAN devices without a GPS capability, current methods of WLAN position locating rely on drive-by surveys of access points (APs) and/or user reporting of AP locations, which may be reported to a database in a central server. The database may be used to calculate the position of a mobile station (STA) from the RSSI and other information of visible APs in close proximity. The server generally does the calculation.

Current methods are generally expensive. The quality and reliability of the service may be a direct function of the frequency and density of the drive-by surveys and the reliability of individual user and/or crowd-source reporting. Additionally, current methods may be limited by the commercial access to the server (typically through an expensive tariff) and may be vulnerable to service outages due to loss of coupling to the server or loss of the server itself (e.g. due to financial insolvency of the server administrator).

Current methods may not directly enable the APs themselves to become self-aware of their own location. (A network device is location self-aware if it has the ability to self-determine its location.) And the current methods may not enable the APs to report/exchange their location to other APs or mobile STAs, or to lookup servers or web applications. (A lookup server may be referred to as a location server.) In addition, current methods may not enable association of the WLAN's IP address and location because drive-by surveys may not easily ascertain the IP address of APs and users typically do not know the current IP address on an instantaneous and continuous basis because IP addresses may be dynamic. Current methods lack AP self-reporting of location.

One current method for an AP to determine its location is for the AP to be equipped with a GPS receiver. Very few APs today may be so equipped because of the cost of GPS receivers and because of the inherent limitations of standard GPS, such as poor indoor coverage.

Additionally, although location systems in portable devices may be widely used, they are generally not secure so there may be concerns relative to the accuracy of such systems.

Thus, it may be beneficial to have a system and method to acquire and update the current location estimates in network devices. Specifically, it may be beneficial if network devices were location self-aware and the network devices may also share location information with other network devices. Further, these methods may benefit if the location information has a high level of security and trust.

SUMMARY

A system for updating self-aware network devices with geographic location information comprises a hybrid WLAN/GPS device that comprises a GPS receiver, a WLAN and a controller and one or more self-aware network devices. The hybrid WLAN/GPS device determines if one of the one or more self-aware network devices is in range of the hybrid WLAN/GPS device and if so, the hybrid WLAN/GPS device couples to one of the one or more self-aware network devices that is in range of the hybrid WLAN/GPS device. Further, the location data stored in the hybrid WLAN/GPS device is compared with the location data of a coupled self-aware network device. The controller comprises software that transfers the more current location data/location assistance data to and/or from the hybrid WLAN/GPS device and the coupled self-aware network device.

The method of self-location includes the following steps:

Enabling self-aware network devices to self-determine and maintain their own location awareness without the need for a GPS receiver, and using hybrid WLAN/GPS devices to assist WLAN-only devices in becoming location self-aware.

Using existing database(s) to "seed" the location awareness algorithm, and sending the self-aware network device's location data to the database.

Pass-by autonomous exchange of location information between self-aware network devices, and avoiding association with a basic service set by bursting the location information in beacon and probe request/response packets.

Access point self-reporting of location data and IP address to a location server and/or directly to web services.

DETAILED DESCRIPTION

Figure 1A:
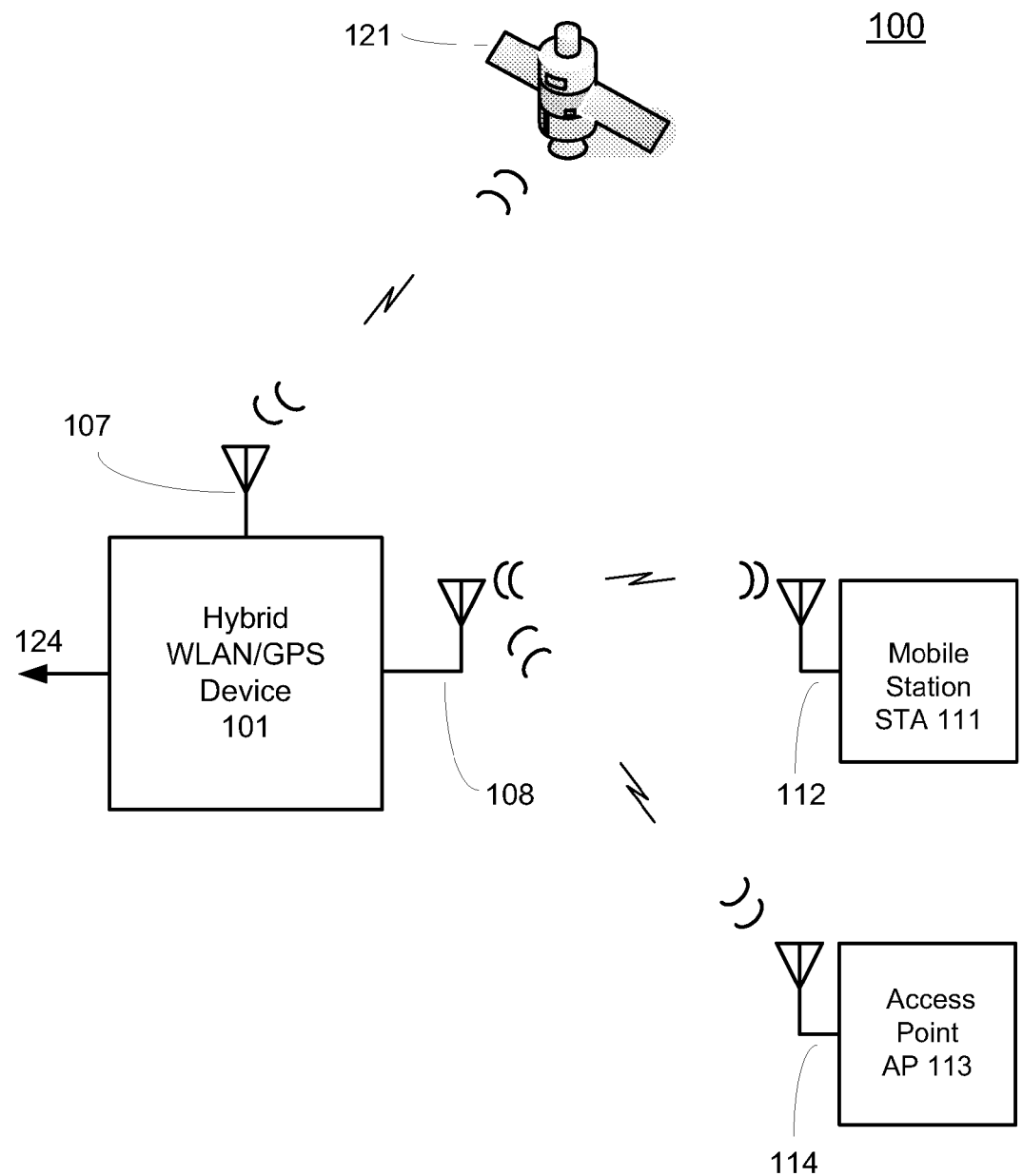
FIG. 1A illustrates three location self-aware network devices comprising a hybrid WLAN/GPS device, a STA and an AP. The STA and AP lack GPS capability.

The systems and methods disclosed are directed to the determination of the location of a device based on a reference system. An example of one such reference system is GPS. Moreover, as described in the Background section, it may be beneficial to have a system and method that provides a procedure to acquire and update the current location estimates in network devices that lack a GPS capability. Specifically, it may be beneficial if network devices were location self-aware and share location information with other network devices. The sharing network may have collective learning, thus resulting in the viral spreading of location information in a network. To facilitate security and other functional benefits, it may also be beneficial if the device that shares location information may be a "trusted" device.

DEFINITIONS

A "hybrid" wireless device is a device including GPS and WLAN functionality. It may be referred to as a hybrid WLAN/GPS network device, or hybrid WLAN/GPS device. Further, the device has features that may allow the GPS functionality to improve the performance of the hybrid WLAN/GPS network device functionality, and vice-versa. A WLAN may be implemented with a variety of technologies including but not limited to the family of IEEE 802.11 standards.

A network device may be any device that communicates within the network e.g. mobile devices (STA), access points (AP), hybrid wireless devices, routers, gateways. A network device may be wireless and/or wired. A network device may be referred to as a transceiver. Additionally, a network device may have a controller with software to control the exchange of information among the network devices. A network device is location self-aware if it has the ability to self-determine its location. The device may or may not have GPS capability. The location self-aware network device has an ability to acquire location information from another self-aware network device. The location self-aware device may be a wireless and/or wired device. The term "location self-aware" may be referred to as "self-aware".

As noted above, a location self-aware network device has the ability to determine its location. A location-only network device is location self-aware, but does not have GPS capability. Location-only network devices may be referred to as WLAN-only devices.

Trusted Source—There are two types of trusted sources for location data/location assistance data: 1) a GPS signal, and 2) a location self-aware network device. In the latter case, the trusted source incorporates an encryption mechanism and encryption algorithm. This encryption algorithm may insure that there is a secure transmission of information from the trusted devices to the network device that desires to receive location data. The encryption mechanism may support public and private keys. Thus, the trusted device's location data/location assistance data may be securely transmitted via the use of authentication and encryption mechanisms. Since a location self-aware network device, may be a trusted source for location data/location assistance data, it may be referred to as a "trusted" network device.

Trusted Location—To obtain a trusted location, the network device or network application acquires at least two trusted sources of location data to determine its location estimate. The network device or network application utilizes authentication and encryption mechanism to insure security of the transmission of the location data/location assistance data from the trusted sources to the network device or network application.

Location data may include current location estimate, ephemeris data and almanac data. The location data is time stamped with the time the location data was updated. A time when the location data expires may be also noted. The "time" includes the date. Ephemeris and almanac are examples of location assistance data.

Location assistance data is data that may assist a location self-aware device to self-determine its location. Location assistance data may be also referred to location-aiding data. Location assistance data may include one or more of the following, but may not be limited to:

Local code phase
Local Doppler
Code phase difference (correction) from local to neighbors
Doppler difference (correction) from local to neighbors
Local time
Accurate delta time
Time corrections
Local almanac
Local ephemeris
Satellite vehicle (SV) in view
Predicted ephemeris and underlying prediction equation terms
Trust rating of local location
Accuracy of local location
Dilution of Precision (DOP) of local constellation
Location information may refer to location data and location assistance information may refer to location assistance data.

Current location estimate—The current location estimate may comprise the current latitude, longitude and elevation of the network device. This current location estimate may be expressed in relative terms, such as relative to the surface of the earth. Other relative measurement systems include civic addressed, e.g. 1700 Technology Drive, $7^{th}$ floor, post number B8. Location estimates also may include an estimate of the measurement uncertainty of the locations. "Current location estimate" may be also referred to as "location estimate". Current location estimates may be obtained by regularly storing a "last good fix" in non-volatile memory. The time of the current location estimate and the expiration time of that estimate may be stored in the network device.

Ephemeris data—GPS satellites include ephemeris data in the signals they transmit to GPS receivers. Ephemeris data may be a set of parameters that may be used to calculate the location of a GPS satellite at a particular point in time. It describes the path that the satellite is following as it orbits Earth. To accurately calculate the location, ephemeris data is usable for a limited time (a few hours or less). Up-to-date data may be required to minimize error that results from minor variations in a satellite's orbit. Ephemeris data is based on the type of GPS satellite system (e.g. Navistar, SBAS, Galileo, etc.)

Almanac data—GPS receivers use almanac data to predict which satellites may be nearby when they are looking for GPS signals. Almanac data includes a set of parameters for each GPS satellite that may be used to calculate its approximate location in orbit. Using almanac data saves time by letting the receiver skip looking for satellites that may be below the horizon. GPS satellites include almanac data in the signals they transmit to GPS receivers. Although variations in satellite orbits may accumulate with time, almanac data doesn't need to be highly accurate to be useful. Data collected before your receiver was last switched off may remain usable for weeks or months. Almanac data may be based on the type of GPS satellite system (e.g. Navistar, SBAS, Galileo, etc.)

As described in U.S. application Ser. No. 12/840,155, filed Jul. 20, 2010, entitled, "MANAGEMENT-PACKET COMMUNICATIONS OF GPS SATELLITE POSITIONS", application data, such as an ephemeris of Global Positioning System (GPS) satellite positions, may be shared, without coupling to a WLAN, by management-packet communication between a station near an AP, and/or between APs, and/or between stations. The WLAN may be compatible with at least one wireless communication protocol that may comply with a version of an Institute for Electrical and Electronic Engineers (IEEE) 802.11 standard.

Additionally, management-packet communication of application data may use management frames or packets to wirelessly communicate the application data, such as location data or location assistance data. Management-packet communication requires no log-on, no authentication, no access permission and no need for the Internet. Thus, employing management packet communications, a station passing close to an AP may transfer the location data or location assistance data.

The ephemeris may be shared using the WLAN by performing management-packet communication between a station near an AP, and/or between a first and a second AP, and/or between a first and a second station. Management-packet communication may use the management packets or frames of a wireless communications protocol employed by the WLAN. This use may involve only a part of the management frame, such as the information element of a beacon frame.

Autonomous Hybrid WLAN/GPS Location Self-Awareness

In one embodiment, a WLAN device may determine its location without the need for its own GPS receiver or in the absence of a GPS satellite signal. In another embodiment, the IP address of a WLAN device may be associated with its location.

Another embodiment seeks to create a secure and seamless communication and computation mechanism by which hybrid WLAN/GPS devices, APs and STAs exchange their known or estimated location, and other information such as timing, in order to enable hybrid WLAN/GPS devices to assist other WLAN-only devices to autonomously become location self-aware of their location without the need for their own GPS receiver. This exchange may be accomplished over-the-air without the need to join or associate to a service set by utilizing very short burst data transmissions, enabling network devices to be aware of each other's absolute and relative positions as they pass by. The computation of self location may be accomplished using an adaptive combination of the location data of nearby APs and passerby mobile STAs that are inherently location aware or have become location self-aware (by the same mechanism), and/or database of known positions of itself and/or neighboring APs (used as a "seed"); and/or a user determination of its location (also a starting "seed").

Additionally, another embodiment creates a secure and seamless mechanism for APs and STAs, after becoming location self-aware or being inherently self-aware, to seamlessly report their location, along with current IP address, that is wired or wirelessly coupled directly to a lookup servers or web services.

As previously noted, one embodiment enables WLAN-only devices (APs and stations lacking GPS) to become self-aware of their location by leveraging the presence of hybrid WLAN/GPS devices that are inherently location self-aware and/or other location self-aware or surveyed-known-location WLAN-only devices. The autonomous communication of location information may be intended to enable the viral spread of location self-awareness beginning with hybrid WLAN/GPS devices and/or "seed" information obtained from existing database of AP locations and eventually spreading to local APs (with the capability to become self-aware), and in particular to those APs that are indoors and lack exposure to GPS satellite coverage.

A network of location self-aware APs may be useful for indoor position locating in the absence of a GPS signal, improving GPS position locating in urban canyon and other low signal and/or high interference environments, and in assisting in WLAN network authentication, joining, and roaming. The ability for peer STAs to exchange location information enables WLAN-only devices to benefit from the inherent location awareness of nearby hybrid WLAN/GPS devices without the need for GPS themselves. A network of location self-aware APs that are able to continuously report their current location and IP address may be useful in creating new methods and channels for delivering location based services.

Some aspects of the aforementioned embodiments include the following three elements:

(1) A communication mechanism for hybrid WLAN/GPS and WLAN-only devices to exchange their location data with other WLAN devices as they "pass-by". The location data may be embedded within beacon and/or probe requests and response bursts in a proprietary format to avoid the need for association with a basic service set (BSS) and/or intervention of host processor. The location data may also include tag information detailing, for example, the time stamp of when the location information was last derived, the method by which the location was determined, and an estimate of its precision or accuracy. Authentication mechanisms prior to exchange ensures that augmentation from only trusted devices may be accepted and encryption of the information ensures that the data has not been tampered with and may be accurately delivered.

(2) An adaptive algorithm that utilizes the fusion of the known or estimated location of nearby APs and passerby STAs, and/or "seed" information from a lookup server that comprises location information (e.g. location server), and/or user reported location to autonomously determine self location either by self calculation or with the assistance of an external calculation or location server. A number of position estimation techniques may be used, either singly or in combination. These may include: self or server computed time-difference-of-arrival (TDOA) triangulation of the burst data transmission (beacon or probe). Examples of suitable TDOA triangulation method were described in U.S. application Ser. No. 12/553,757, entitled, "SYNCHRONIZATION-FREE STATION LOCATOR IN WIRELESS NETWORK". Other TDOA methods may also be suitable. Another position estimation technique includes centre-of-mass estimation using RSSI-weighted range. The calculated location may be stored internally within the network device, e.g. an AP, continuously updated, and autonomously communicated to other WLAN devices using the method described in (1). The aforementioned "adaptive algorithm" may be referred to as a "location awareness algorithm".

(3) A communication mechanism for the WLAN device to self-report its known or estimated location along with its current IP address to a lookup server or directly to web services.

FIG. 1A describes a system for updating network devices with geographic location information. The system described includes three network devices, as shown in embodiment 100. One network device is a hybrid WLAN/GPS device 101; another network device is a mobile station, STA 111, and another network device is an access point, AP 113. These network devices have WLAN capability, and are self-aware, but only the hybrid WLAN/GPS device 101 has a GPS capability. Hybrid WLAN/GPS device 101 may include a connection 124 to web services and/or a lookup server that is a location server.

Hence, as self-aware network devices, STA 111 and AP 113 are able to determine their location by receiving location data/location assistance data from another location aware network device. Note that the location data we may share among devices may be complete location estimates with x,y and z coordinates completely resolved. Or they may be partial location measurements based on incomplete measurements from the location reference system. In this way two self-aware devices may share partial measurements when one or both of the devices does not see enough navigation satellites to resolve a complete fix. Collectively the two devices, sharing partial measurements, may compute a collective location fix. Per FIG. 1A, the hybrid WLAN/GPS device 101 may receive a GPS signal from GPS satellite 121 via GPS antenna 107 and obtain a location fix or current location estimate. Subsequently, if self-aware STA 111 and AP 113 are within range of hybrid WLAN/GPS device 101, STA 111 and AP 113 may couple with hybrid WLAN/GPS device 101 via WLAN antenna 112 and WLAN antenna 114, respectively. Another antenna for the hybrid WLAN/GPS device 101 is WLAN antenna 108. Subsequently, the location data stored in the hybrid WLAN/GPS device 101 is compared with the location data coupled from one or more self-aware network device.

Note that the communications previously described are management-packet communication that may use the management packets or frames of a wireless communications protocol employed by the WLAN. This use may involve only a part of the management frame, such as the information element of a beacon frame.

In summary, a system for updating self-aware network devices with geographic location information comprises a hybrid WLAN/GPS device 101 that comprises a GPS receiver, a WLAN and a controller; and one or more self-aware network devices, such as STA 111 and AP 113. The hybrid WLAN/GPS device 101 determines if one of the one or more self-aware network devices is in range of the hybrid WLAN/GPS device 101 and if so, the hybrid WLAN/GPS device 101 couples to one of the one or more self-aware network devices that is in range of the hybrid WLAN/GPS device 101. Further, the location data stored in the hybrid WLAN/GPS device 101 is compared with the location data in the coupled one or more self-aware network device. The controller comprises software that transfers more current location data and/or timing data to and from the hybrid WLAN/GPS device 101 and coupled one or more self-aware network devices, such as STA 111 and AP 113.

The hybrid WLAN/GPS device 101 and the one or more self-aware network devices store location data, wherein the location data may comprises a combination of current location estimate, ephemeris data and almanac data. Further, the location data is associated with IP address of the hybrid WLAN/GPS device and/or the IP address of the one or more self-aware network devices.

If the location data stored in the hybrid WLAN/GPS device 101 is more current as compared with the location data in a coupled self-aware network device, the location data and/or the timing data of the hybrid WLAN/GPS device 101 is transmitted to the coupled self-aware network device, wherein the location data of the coupled self-aware network device is updated.

The time, when the coupled self-aware network device is updated, is stored in the coupled self-aware network device. Also, the time when the location data of the coupled self-aware network device expires is stored in the coupled self-aware network device.

If the location data stored in a coupled self-aware network device is more current as compared with the location data in the hybrid WLAN/GPS device 101, the hybrid WLAN/GPS device 101 receives the location data and/or timing data of the coupled self-aware network device, wherein the location data of the hybrid WLAN/GPS device 101 is updated. Also, the location data of the hybrid WLAN/GPS device 101 may be updated by a network coupling to web services or to a lookup server.

The hybrid WLAN/GPS device 101 and the network device may comprise one or more integrated circuits.

The one or more self-aware network devices may determine their current location by an adaptive algorithm. The adaptive algorithm calculates the current location of the one or more self-aware network devices based on a combination of:
  known or estimated location of nearby self-aware network devices;
  seed information from a location server;
  user reported location to autonomously determine self location either by self calculation or with assistance of an external calculation;
  self or server computed time-difference-of-arrival triangulation of burst of data transmission;
  Center-of-mass estimation using RSSI weighted range.

Further, the calculated current location is stored internally with the one or more self-aware network devices, the calculated current location is continuously updated, and calculated current location is autonomously communicated to other self-aware network devices.

The aforementioned embodiments may have the following advantages over available solutions:

The system and method may be significantly cheaper than current WiFi locating methods because drive-by surveying may not be required to determine the location of APs or to maintain any location database. The location of the AP may be self-derived and the location awareness of the network may be autonomously spread from one AP or mobile STA to an adjacent AP.

The system and method may be significantly more reliable because APs continuously determine and update their own location. A drive-by survey may not be required to discover any newly added AP or update the database for any removed or moved AP. And because the APs themselves store and forward their location information, this system and method may be inherently immune to any single point failure such as loss of communication to the server or loss of the server itself. The system and method also enable the easy association of IP address (of AP and associated STAs) with the location of the AP, something which may be not possible with current methods.

The system and method may be significantly cheaper than pure hybrid WLAN/GPS methods because they may not require the AP and/or STA devices to be equipped with GPS in order to achieve location awareness. It may be also able to spread location awareness to deep indoor environments where GPS coverage may be limited or non-existent.

Figure 4A:
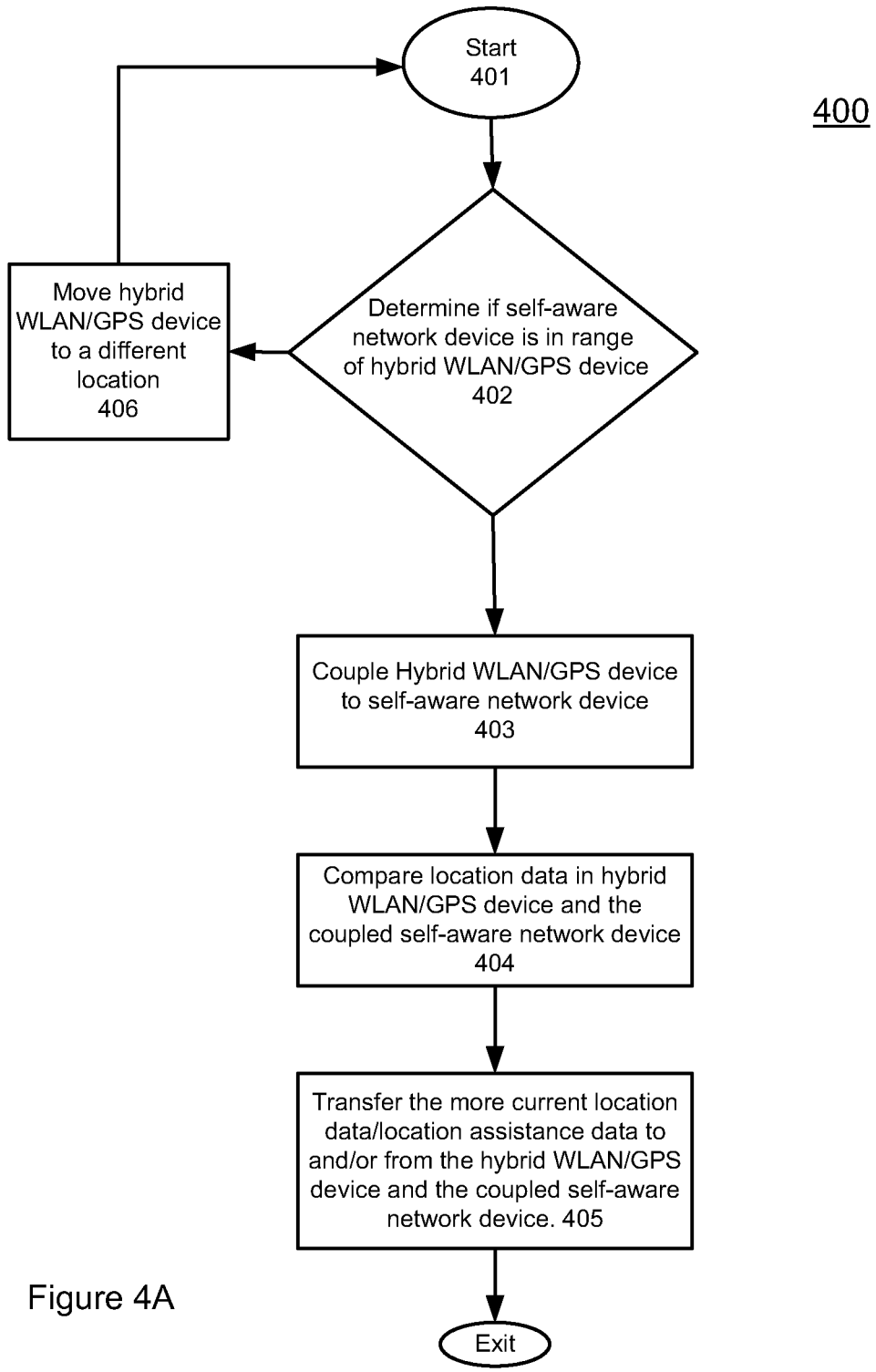
FIG. 4A illustrates a method for transferring location data to and/or from a coupled self-aware network device.

FIG. 4A illustrates a method for transferring location data to and/or from a coupled self-aware network device. Per embodiment 400, the method starts with step 401. In step 402, a hybrid WLAN/GPS device determines if a self-aware network device is in range. If there is no self-aware network device in range, then the hybrid WLAN/GPS device may move to a different location in step 406 and re-starts the process. Otherwise, the hybrid WLAN/GPS device couples with the self-aware device in range in step 403. Once coupled, the hybrid WLAN/GPS device and the coupled self-aware device compare their respective location data/location assistance data in step 404. Then, the more current location data, location assistance data or timing data is transferred to and/or from the hybrid WLAN/GPS device and the coupled self-aware network device in step 405. If required, the self-aware network device or hybrid WLAN/GPS device may analyze the location data and may calculate a more current location for the respective device in step 406.

Figure 4B:
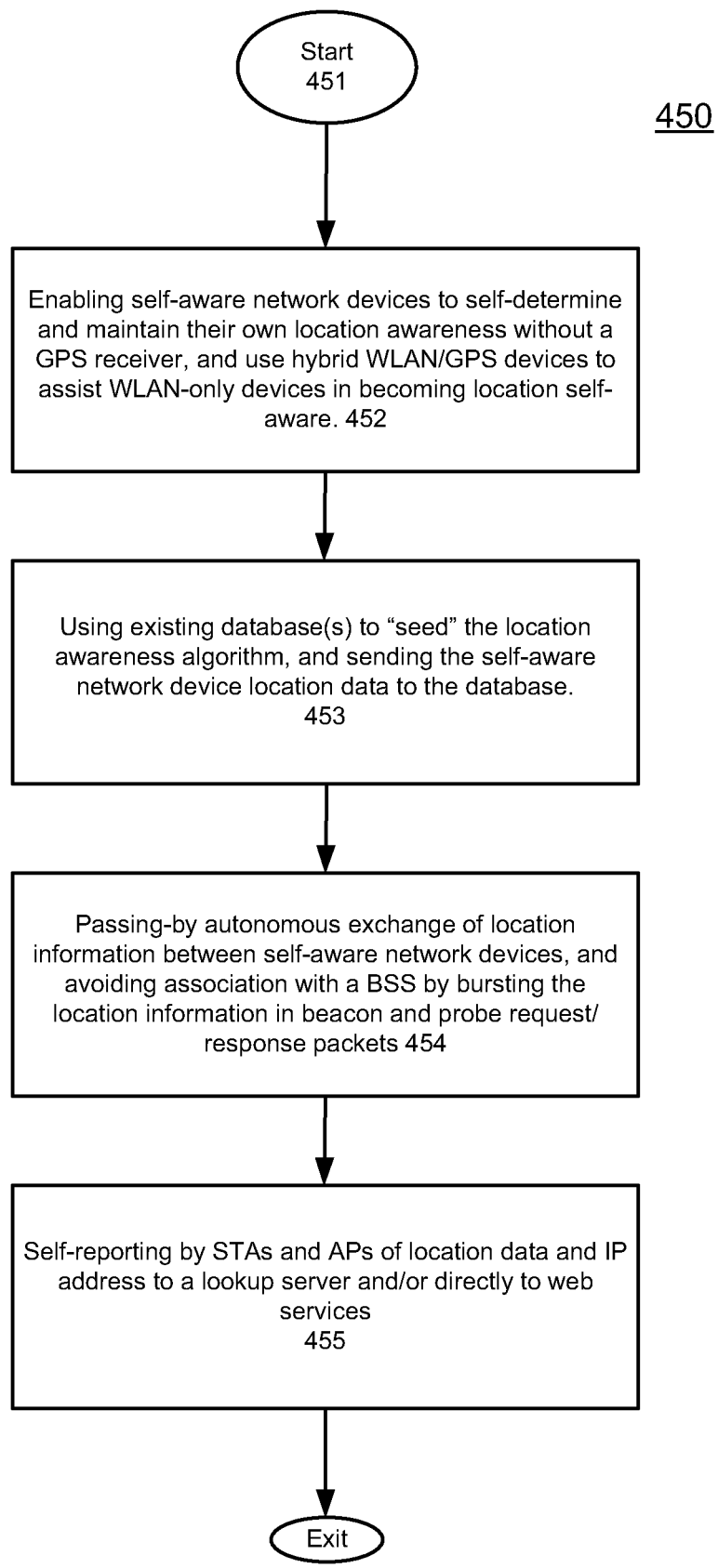
FIG. 4B illustrates a method for updating network devices with location information.

Further details on the method of self-location are illustrated by embodiment 450 in FIG. 4B. The method for updating network devices with location information starts with step 451.

Step 452—Enabling APs to self-determine and maintain their own location awareness without a GPS receiver, and using hybrid WLAN/GPS devices to assist WLAN-only devices in becoming location self-aware.

Step 453—Using existing database(s) to "seed" the location awareness algorithm, and feeding the AP self-aware location data back to the database.

Step 454—Pass-by autonomous exchange of location information between WLAN devices, and avoiding association with a basic service set by bursting the location data in beacon or probe request/response packets.

Step 455—Self-reporting by access points and mobile stations of location data and IP address to a lookup server and/or directly to web services.

Location Only Access Point for Hybrid Communications Network

Other embodiments may improve the speed and accuracy of determining a location of a network device by reducing the active links from the APs to the cloud. Also, the requirement for site surveys may no longer be needed. Currently, enterprise grade indoor location systems in use today require site surveying to provide indoor location coverage. A network of hybrid devices may eliminate the need for surveying to deliver high yield and accurate indoor location.

With a hybrid WLAN/GPS device in a network, additional APs may be added that may be used to assist in determining indoor location. These location-only APs do not need any coupling to a communications backbone. These APs only need to be coupled to a power source, or may even be battery powered in some cases.

APs in the Atheros hybrid WiFi-GNSS network may be location enabled (self-aware). They may 1) determine their own absolute locations in geodetic or civil reference frames, 2) determine the relative location of other APs and STAs in range, 3) share location and location-related information such as time and ephemeris with neighboring APs and STAs, and 4) keep logs of the locations of the nodes on the system. One benefit of the aforementioned embodiment may be an improvement to the network that allows additional APs to be added for location-only, without the cost of running communications circuits to those APs. They locate themselves using GNSS or indoor WiFi-based location signals, and they exchange location and location-related information with each other and with the STAs via a wireless link.

Figure 1B:
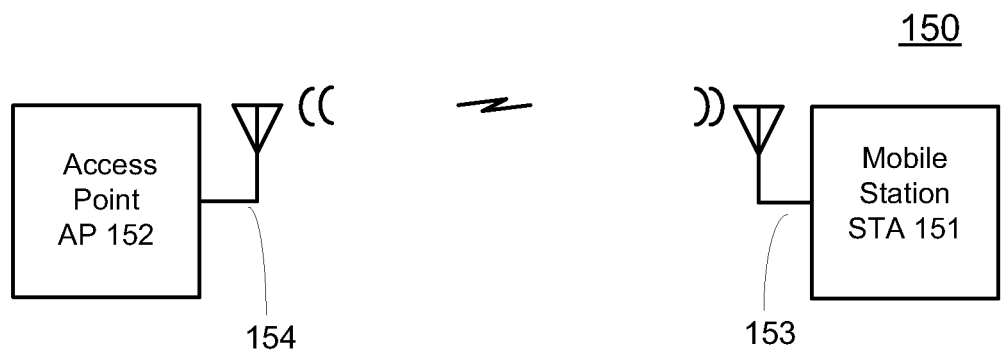
FIG. 1B illustrates two location self-aware network devices comprising a STA and an AP. The STA and AP lack GPS capability and are location-only network devices.

FIG. 1B illustrates embodiment 150 with two location-only network devices, access point, AP 152 and mobile station, STA 151, with WLAN antenna 154 and WLAN antenna 153 respectively. In this embodiment, AP 152 and STA 151 lack a GPS capability. Since these network devices are location self-aware, they communicate with each other to determine which network devices has more current location data. Once that status of the location data may be determined the network device that has more current location data, transfers that location information to the network device that had less current location data. The network devices communicate with one another by an exchange of a short burst of data transmission without the need to join or associate to a service set. The location data and/or location assistance data may be embedded in the short burst of data transmission. The short burst of data transmission may be a beacon and/or probe requests and response bursts.

Figure 1C:
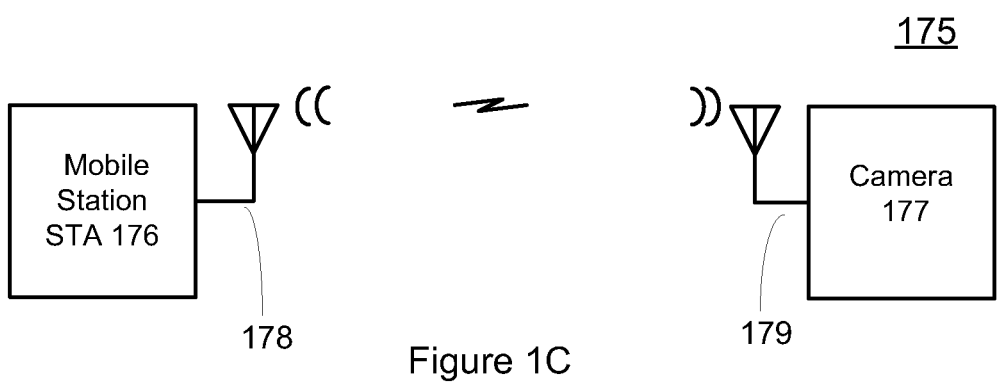
FIG. 1C illustrates two location self-aware network devices comprising a STA and a camera. The two devices are location-only network devices.

Another embodiment involves two mobile devices or STAs. FIG. 1C illustrated embodiment 175 with two location self-aware network devices comprising a mobile station, STA 176 and a camera 177, with WLAN antenna 178 and WLAN antenna 179, respectively. The two devices are location-only network devices, as they lack a GPS capability. If camera 177 desires to obtain a location update, camera 177 may send a beacon message. If STA 176 is passing by, STA 176 may receive the beacon and transmit location data/location assistance data to camera 177. Hence, camera 177 may obtain a current location estimate. In this embodiment, camera 177 may be any type of mobile station.

Figure 1D:
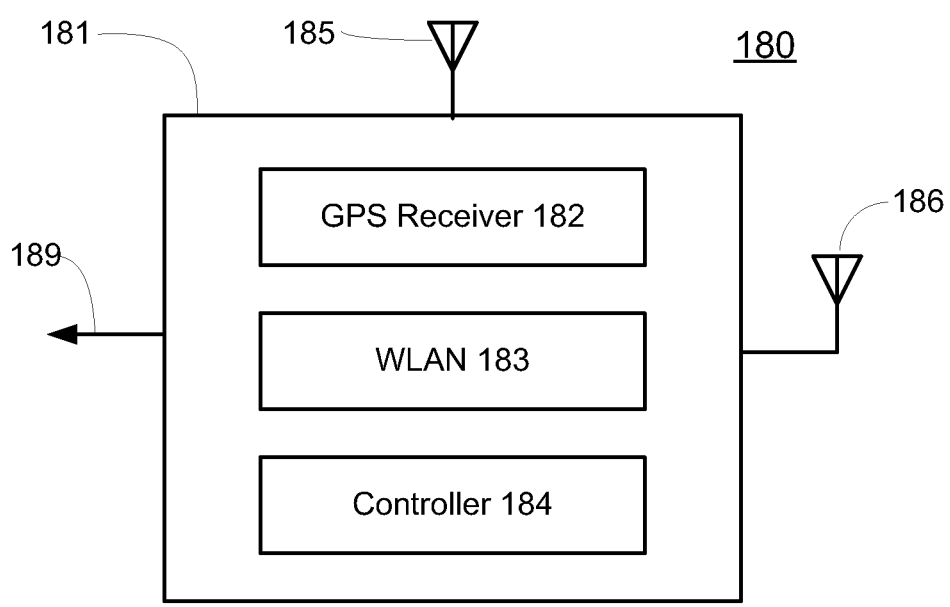
FIG. 1D illustrates a hybrid WLAN/GPS device in accordance with some embodiments.

An embodiment of hybrid WLAN/GPS device 101 from FIG. 1A is illustrated in FIG. 1D with embodiment 180. As shown, hybrid WLAN/GPS device 181 comprises GPS receiver 182, WLAN 183, controller 184, GPS antenna 185 and WLAN antenna 186. Also shown is connection 189 providing an interface to the internet or a server.

Alternatively, indoor coverage may be improved by adding APs with communication links. This alternative may limit the number of APs due to the cost and difficulty of adding communication links to the APs.

A possible workaround may be to use the power line to couple to the APs. This workaround may add cost to the location-only AP.

Trusted Hybrid Location System

Another aspect of the embodiments may be to provide the trusted location of a user in those cases where location based rights or identity validation may be necessary or useful. For example, in a consumer electronic product the rights to view a movie, TV show or read a textbook may be controlled with knowledge of the location of the user.

Although location systems in portable devices are widely used, they are generally not secure enough to be considered trusted. Thus, location systems in portable devices may be spoofed or hacked. In contrast, location based payment systems, such as credit card readers may be trusted, but not very mobile.

Consumer devices with GPS or AGPS location sensors may be widely used, providing mobility and accurate location fixes. Because there may be only a single location sensor and that sensor lacks a secure ID key, they may not be considered trusted. Fixed credit card readers may be a highly trusted way of determining a user's location at the time of payment, so they may be trusted location determination devices. They may be fixed to one location and not very mobile.

Another embodiment utilizes a network of self-aware network devices, including hybrid WLAN/GPS devices, APs and STAs to provide the "trusted location" of location to interested and authorized third parties. This location information may be trusted by virtue of the fact the location information may be obtained from two or more independent sources that may be the WLAN-only and/or a network devices with a GPS capability, so the redundancy may be used to verify the location estimate. The network devices may have unique and unalterable ID codes built into them, which may be used, along with public and private encryption key systems to deliver tamper-proof location estimates. These trusted sources may be used in applications such as location based digital rights management (DRM), location based payment systems, and theft prevention. A MAC address may be one example of an ID code.

Additionally, network devices that have chip ID may be non-volatile and typically have their chip ID stored in a read only memory.

Two types of trusted sources include: 1) a GPS signal, and 2) a location self-aware network device. In the latter case, the trusted source incorporates an encryption mechanism and encryption algorithm. This encryption algorithm insures that there may be a secure transmission of information from the trusted devices to the device that desires to receive location data. The encryption mechanism may support public and private keys. The encryption mechanism may operate in two modes: (1) the encryption mechanism may encrypt an information element of the location data, and (2) inside the location data there may be a trusted code, such as the chip ID. Integrated circuits may have a chip ID and the chip ID may be incorporated inside the encryption mechanism. In one embodiment, the private key encrypts the chip ID. The public key may decrypt it only if associated with the chip ID.

To obtain a trusted location, the network device or network application acquires at least two trusted sources of location data to determine its location estimate. The network device or network application utilizes authentication and encryption mechanism to insure security of the transmission of the location data/location assistance data from the trusted sources to the network device or network application. For example, a network device has a chip ID, so the transmission includes authentication of the data in the non-volatile read only memory and decryption of the transmission. In one case, the network device has a chip ID and the transmission may be completed in a non-tamper (encryption) and non-volatile manner. In the case where the transmission may be to a network application, the transmission may be completed in non-tamper manner (encryption), since the application does not have a chip ID.

These authentication and encryption mechanisms provide a secure ID to insure the basis for a trusted location estimate. Encryption may include public and private encryption keying, to determine the trusted location of a mobile user. Once a given user's location has been declared trusted, his device then becomes authorized to use location based materials such as movies, TV shows and text books.

Figure 2A:
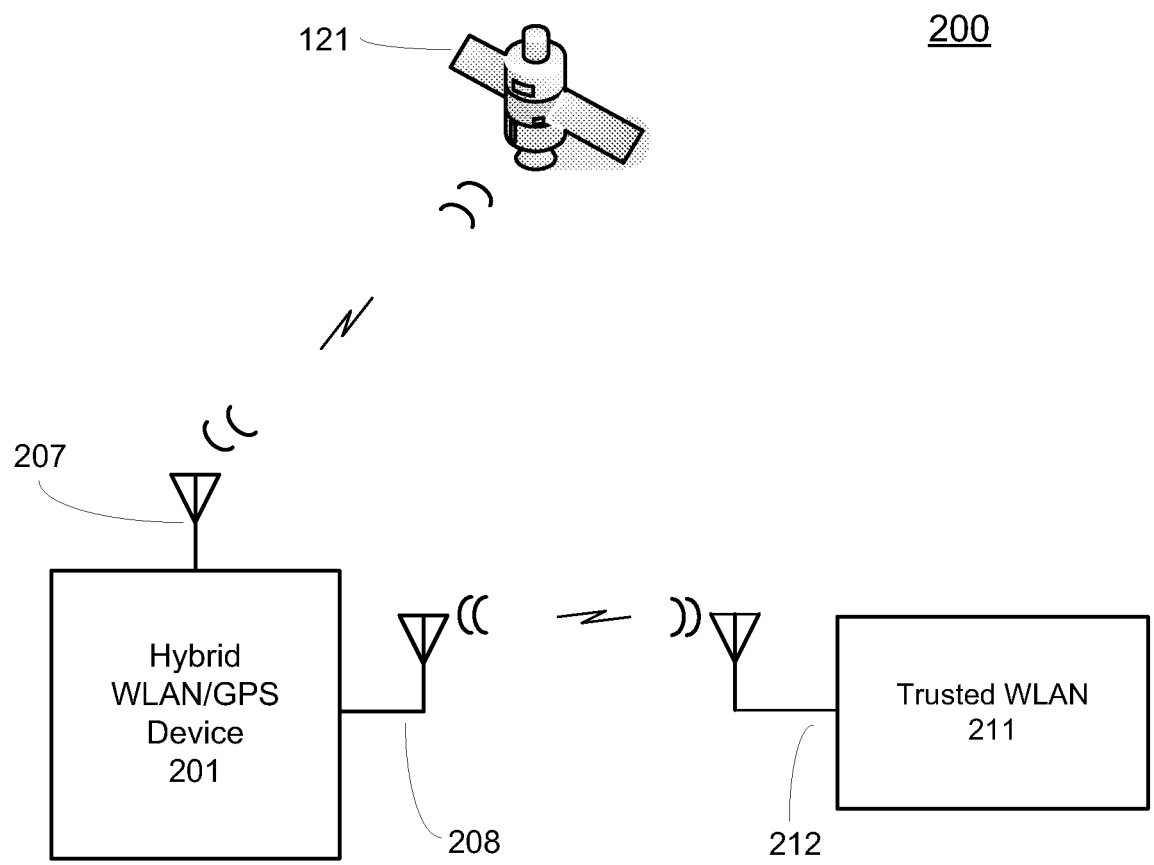
FIG. 2A illustrates a hybrid WLAN/GPS device receiving location data/location assistance information from a GPS satellite and a trusted WLAN device.
Figure 2B:
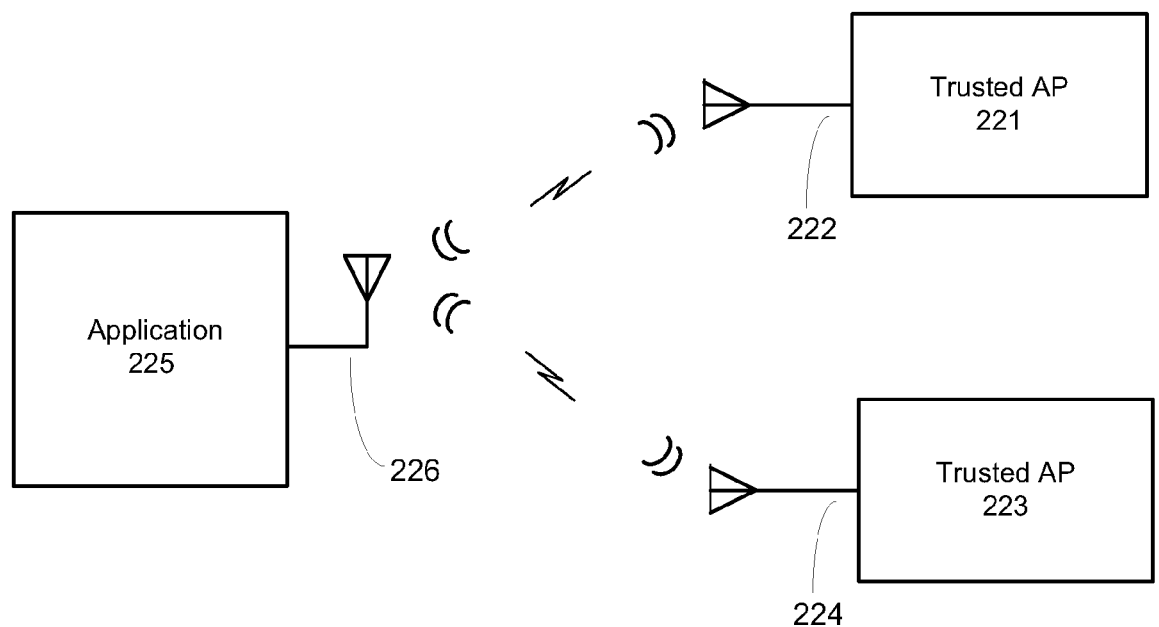
FIG. 2B illustrates an application receiving location data/location assistance information from two trusted APs.
Figure 2C:
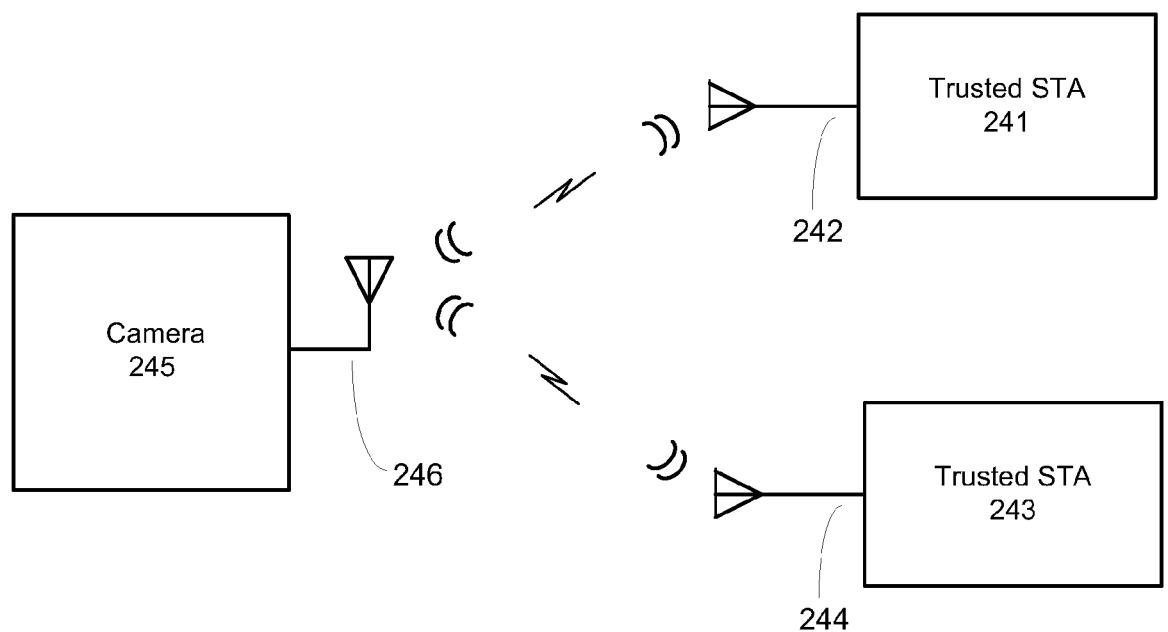
FIG. 2C illustrates a camera receiving location data/location assistance information from two trusted STAs.

Embodiments of the aforementioned are provided in FIGS. 2A, 2B and 2C. In FIG. 2A embodiment 200 includes hybrid WLAN/GPS device 201, trusted WLAN 211 and GPS satellite 121. Trusted WLAN 211 is an AP or a STA. Hybrid WLAN/GPS device 201 desires to obtain a trusted location. As previously discussed, a trusted location is obtained by receiving location data/location assistance data from at least two trusted sources where the data received has been authenticated by encryption. In embodiment 200, the trusted sources are GPS satellite 121 and trusted WLAN 211. Hybrid WLAN/GPS device 201 receives the GPS signal as part of a GPS operation. A GPS signal may be considered a trusted source. Also, hybrid WLAN/GPS device 201 sends a beacon to request location data. That beacon is received by trusted WLAN 211. The encryption mechanisms of the hybrid WLAN/GPS device 201 decrypt the chip ID of the trusted WLAN 211, and then decrypt the location data/location assistance data sent by the trusted WLAN 211. The transmission received by hybrid WLAN/GPS device 201 is non-tamper encryption since location data/location assistance information is authenticated by an encryption algorithm. Additionally, the transmission is additionally secured since the hybrid WLAN/GPS device 201 has a non-volatile secure ID. The transmissions are supported by GPS antenna 207 and WLAN antenna 212 and WLAN antenna 208.

In a second scenario, FIG. 2B embodiment 220 includes application 225 and two trusted access points, AP 221 and AP 223. Application 225 has WLAN capability, such as WiFi, and may communicate with AP 221 and AP 223. Application 225, AP 221 and AP 223 lack a GPS capability. In this embodiment, application 225 may calculate a trusted location based on receiving authenticated transmissions from AP 221 and AP 223. The basis for authentication transmission of the trusted location may be the non-tamper encryption. Since application 225 lacks a secure chip ID, the application may lack non-volatility. The transmissions are supported by WLAN antenna 222, WLAN antenna 224 and WLAN antenna 226.

In a third scenario, FIG. 2C embodiment 240 includes a camera 245 and two trusted mobile stations, STA 241 and STA 243. Camera 245 has WLAN capability, such as WiFi, and may communicate with STA 241 and STA 243. Camera 245, STA 241 and STA 243 lack a GPS capability. In this embodiment, camera 245 may calculate a trusted location based on receiving authenticated transmissions from STA 241 and STA 243. Since STA 241 and STA 243 have a secure chip ID, the basis for the trusted location includes non-tamper proof and non-volatile properties. The transmissions are supported by WLAN antenna 242, WLAN antenna 244 and WLAN antenna 246.

Figure 5:
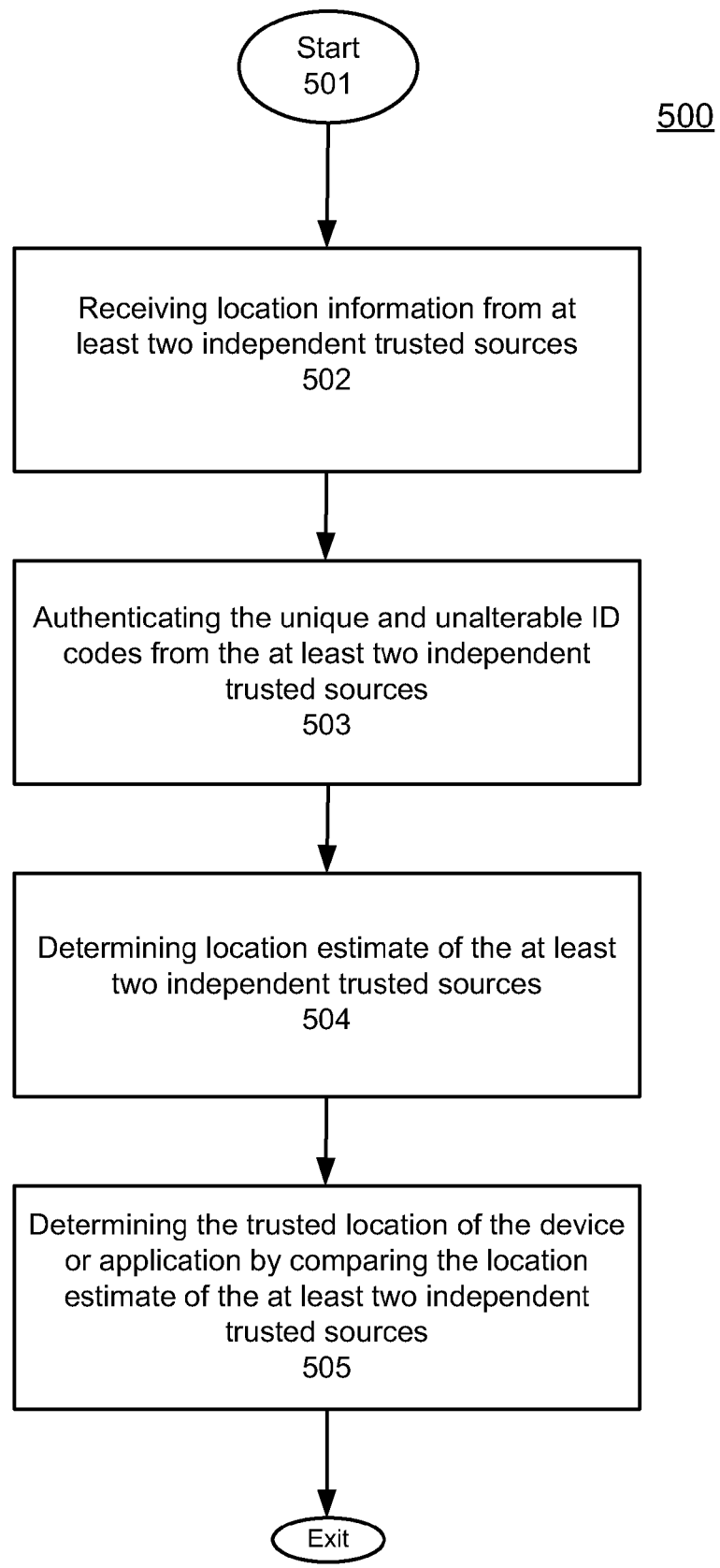
FIG. 5 illustrates a method for method for determining a trusted location for a device or application The components in the figures are not necessarily to scale, emphasis instead being placed upon illustrating the principles of the embodiments disclosed in this Specification. In the figures, like reference numerals designate corresponding parts throughout the different views.

A method for determining a trusted location for a device or application is illustrated in FIG. 5, embodiment 500. The method starts with step 501 and comprises the steps of receiving location information from at least two independent sources, wherein the at least two independent sources have unique and unalterable ID codes (step 502); authenticating the unique and unalterable ID codes from the at least two independent sources (step 503); determining location estimate of the at least two independent sources (step 504); and determining the trusted location of the device or application by comparing the location estimate of the at least two independent sources (step 505).

Additionally, authentication for the method may be based on non-tamper-proof properties of the device or application. The non-tamper-proof properties may be based on the unique and unalterable ID codes of the device or application and the one or more independent sources, wherein public and private encryption keying may be utilized for authentication. Further, the authentication may be based on non-volatile properties of the device. The non-volatile properties of the device may be implemented by a read-only memory.

For this method, an independent source may be either a GPS signal or a trusted WLAN device. A trusted WLAN device may be either a hybrid WLAN/GPS device, an AP, or a STA device. The device or application receives location data and local assistance data from the at least one or more independent sources. Once the device or application has a trusted location, the device or application becomes authorized to use location-based materials based on their trusted location. The method may be suitable for location-based material such as movies, TV shows and textbooks.

The method also applies to determining a trusted status for a device or application. The equivalent steps include receiving status information from at least two independent sources, wherein the at least two independent sources have unique and unalterable ID codes; authenticating the unique and unalterable ID codes from the at least two independent sources; determining a status estimate of the at least two independent sources; and determining the trusted status of the device or application by comparing the status estimate of the at least two independent sources. For this embodiment the trusted status may include location, time, near-field communication (NFC), and/or financial status items.

In summary, a system for determining a trusted location comprises a network device or application; and at least two independent sources of location data, wherein the at least two independent sources have unique and unalterable ID codes, wherein the network device receives and authenticates the location data, wherein the network device calculates a trusted location estimate based on comparing the location data of the at least two independent sources. The network device receives status information from one of the at least two independent sources.

Authentication may be based on non-tamper-proof properties the device or application. The non-tamper-proof properties may be based on the unique and unalterable ID codes of the device or application and the one or more independent sources, wherein public and private encryption keying may be utilized for authentication. Also, the authentication may be based on non-volatile properties of the device. The non-volatile properties of the device may be implemented by a read-only memory. An independent source may be either a GPS signal or a trusted WLAN device.

The aforementioned embodiment has an advantage over the prior art mobile location systems in that this system delivers tamper proof and trusted locations that may be suitable for digital rights management (DRM) applications. The advantage of this system over trusted location systems such as credit card readers may be mobility. Users may roam around an area, such as a university campus, and maintain their digital rights to read the text books.

Alternatives include providing DRM that may not be location based, for example time-based DRM. Or to use a fixed location trust system (NFC, credit card reader) to occasionally recharge the time-based DRM system.

One advantage of the embodiments may be its low cost for delivery of a highly trusted location. The consumer devices may already contain the hybrid WiFi-GNSS location system client chips for other reasons. Therefore, the only additional cost may be to make the WiFi and GNSS sensors include non-volatile ID codes to support the encryption certificates.

Ad-Hoc WiFi-AGPS System or Locally Derived Location Data

There may be a growing worldwide network of "network devices", such as APs and STAs, many of which have embedded location capability. This network of network devices may be configured in a way to provide location estimates with a method of collective learning and sharing of the aiding information between network devices in the same location or nearly the same location.

Many network devices in this system may be self-locating, using a variety of sensors and received signals, such as GPS, GLONASS, COMPASS, Galileo, SBAS, or other signals like FM, TV, etc. Barometric pressure and acceleration sensors may also be used to detect absolute or relative location, or to detect movement and re-initiate a self-location sequence.

Network devices may learn their own locations (self-locate), and then share that information with the other APs and STAs within range. In addition to sharing their locations, location assistance data may be shared, such as Local code phase, Local Doppler, Code phase difference (correction) from local to neighbors, Doppler difference (correction) from local to neighbors, Local time, Accurate delta time, Time corrections, Local almanac, Local ephemeris, SV's in view, ESP predictions, i.e. predicted ephemeris, Trust rating of local location, Accuracy of local location, DOP of local constellation, ESP predictions and underlying prediction equation terns, and Always ready to re-calibration measurements Location assistance data represents a high quality and complete set of the information that may be used to allow a new network device to quickly and accurately locate itself once it moves within range of another network device. If the new network device may not locate itself, the system of the network device has the ability to determine the relative location of the new network device compared to each network device in the ad-hoc network. Using this information and the previously known locations of the other transceivers, the new network device may locate itself even in cases when its own GNSS receiver plus the available aiding information may be insufficient to get a location fix. For example, STAs moving from outside to inside the network may immediately share their accurate and timely assistance information with the nearest AP, and with the other STAs in range. The AP's also use this shared information to refine their self-location estimates over time.

Since the prior art methods involve the collection of aiding information in one central location, then the transmission of the aiding information over a distance to a remote mobile device, the resulting aiding information was inherently imprecise. The position aiding information, for example, may be "approximate position aiding," and not the actual position of the device. The timing aiding may be delayed by the distance between the central timing reference and the remote handset. The code phase and Doppler offsets may be similarly offset. These imperfections, delays and offsets make it more difficult for the remote receiver to obtain an aided location fix, and may make it necessary for the receiver to use more memory and power in the network device.

An improvement provided by the embodiments may be the sharing of location-aiding information between devices that may not be in remote locations. Rather the devices may be in nearly same location. Aiding information that may be collected by one hybrid WLAN/GPS device and shared with another in the same room may be more accurate than location data obtained from remote network device. For example, an AP that has not located itself may receive ephemeris, time, code phase and Doppler assistance from a STA that just entered the room from outdoors. This AP may then immediately get location data and using this information to narrow the search range such that it may significantly improve its sensitivity and time to first location estimate. Another STA in range that is indoors may then obtain this same information from the AP.

Figure 3:
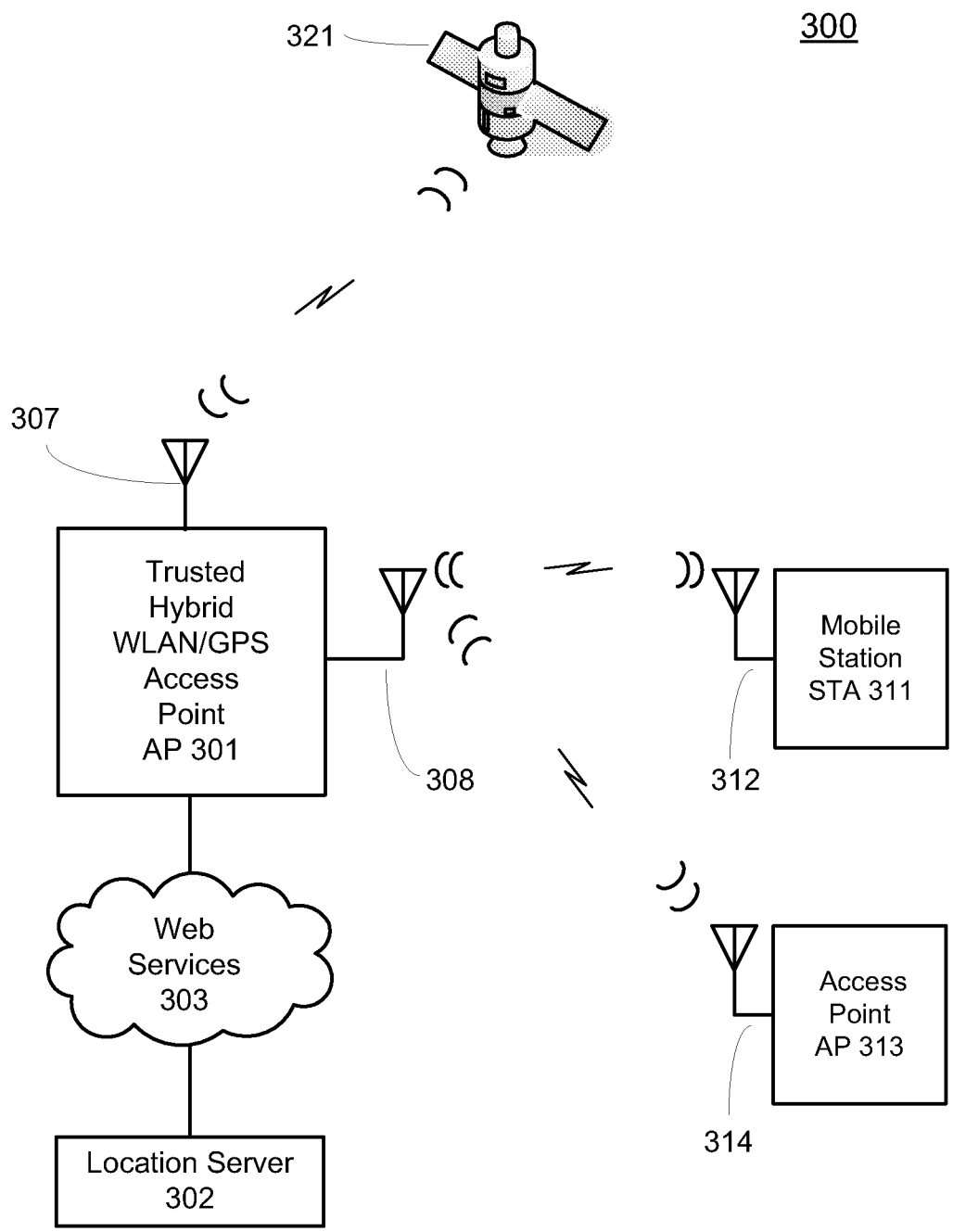
FIG. 3 illustrates a trusted hybrid WLAN/GPS access point communicating with two location self-aware wireless devices

Hence, network devices with self-location ability may collect and share high quality aiding information, then calculate and determine its current location. Network devices may passively spread location data without explicit requests direction from other elements in the network. The action may be described as viral communication of the location data/locations assistance data. An example of this application is illustrated in embodiment 300, shown in FIG. 3. Embodiment 300 includes a GPS satellite 321, trusted hybrid WLAN/GPS access point, AP 301, mobile station, STA 311, access point, AP 313, location server 302 and web services 303. AP 301 receives location data and location assistance data from GPS satellite 321 and location server 302 or web services 303. STA 311 and AP 313 send a beacon, requesting location data/location assistance data. Subsequently, AP 301 transmits current location data/location assistance data to STA 311 and AP 313. STA 311 and AP 313 may use the "quality" location assistance data to calculate a current location estimate. Once that location estimate is available, STA 311 and AP 313 may virally share that estimate with other STAs and APs. AP 301 includes GPS antenna 307 and WLAN antenna 308. STA 311 includes WLAN antenna 312 and AP 313 includes WLAN antenna 314.

The performance of the aforementioned system may be superior to prior art systems because of the close proximity of the devices that may be sharing the location-aiding data. The network bandwidth of this system may be also much less because the network may be ad-hoc in nature. No central server may be necessarily required and no long-distance data paths may be required to share the aiding data.

Alternatives to providing the location-aiding data between adjacent devices include not using aiding data, or transmitting the data from a distance away. For outdoor use, for devices that lack aiding data may be generally acceptable. For indoor use, devices that include a cellular modem for long-range communications, the long-distance aiding data may be generally used and acceptable. For consumer devices that contain WiFi transceivers but lack a cellular modem (hence they may be limited to indoor use), the current alternatives may not be acceptable.

A workaround may be possible if one set out to make a consumer device that did not have a cellular modem and had to work indoors, one may add auxiliary receivers to "sniff" the signals and gain a rough idea of one's location using these signals. Cellular, FM and TV sniffers for example may be used. These sniffing receivers add cost and may not provide high quality aiding information, and therefore may only provide approximate, not precise location fixes.

While various embodiments have been described, it may be apparent to those of ordinary skill in the art that many more embodiments and implementations may be possible that are within the scope of the embodiments. For example, any combination of any of the systems or methods described in this disclosure may be possible. In addition, the systems and methods described were directed the collective learning and sharing of geographic location information. One skilled in the art may recognize that the systems and method may be not limited to geographic location information and may apply to other types of information.

What is claimed:

1. A method of operating a hybrid wireless device that receives signals from a number of global positioning satellites and exchanges data with a wireless local area network (WLAN) device, the method comprising:
   receiving, from the global positioning satellites, first location data indicating a location of the hybrid wireless device;
   determining whether the hybrid wireless device is within a wireless range of the WLAN device;
   wirelessly coupling the hybrid wireless device to the WLAN device if the hybrid wireless device is within the wireless range;
   receiving, from the WLAN device, second location data indicating a location of the WLAN device;
   comparing the first location data with the second location data;
   updating the first location data with the second location data if the comparing indicates that the second location data is more current than the first location data; and
   transmitting the first location data to the WLAN device if the comparing indicates that the first location data is more current than the second location data.

2. The method of claim 1, wherein the first location data comprises at least one of the following: a current location estimate of the hybrid wireless device, ephemeris data of the global positioning satellites, and almanac data of the global positioning satellites.

3. The method of claim 1, wherein the first location data is associated with an Internet Protocol (IP) address of the hybrid wireless device.

4. The method of claim 1, wherein the WLAN device is a self-aware access point.

5. The method of claim 1, wherein the WLAN device is a self-aware mobile station.

6. The method of claim 1, wherein the second location data is associated with an Internet Protocol (IP) address of the WLAN device.

7. The method of claim 1, further comprising:
   updating the first location data to a network including a location server.

8. The method of claim 1, wherein the WLAN device is to determine the second location data by executing an adaptive algorithm.

9. The method of claim 8, wherein the adaptive algorithm is to calculate the second location data based on any one or more of the following:
   known or estimated locations of nearby self-aware network devices;
   seed information from a location server;
   user reported location to autonomously determine self location either by self calculation or with assistance of an external calculation;
   computed time-difference-of-arrival triangulation of a burst of data transmission; and
   center-of-mass estimation using a received signal strength indicator (RSSI) weighted range.

10. The method of claim 9, wherein the calculated second location data is stored internally within the WLAN device.

11. The method of claim 9, wherein the calculated second location data is continuously updated.

12. The method of claim 9, wherein the calculated second location data is autonomously communicated to other self-aware WLAN devices.

13. A system comprising:
a hybrid wireless device to receive signals from a number of global positioning satellites and to exchange data with a wireless local area network (WLAN) device,
wherein the hybrid wireless device is configured to:
receive, from the global positioning satellites, first location data indicating a location of the hybrid wireless device;
determine whether the hybrid wireless device is within a wireless range of the WLAN device;
wirelessly couple the hybrid wireless device to the WLAN device if the hybrid wireless device is within the wireless range;
receive, from the WLAN device, second location data indicating a location of the WLAN device;
compare the first location data with the second location data;
update the first location data with the second location data if the comparing indicates that the second location data is more current than the first location data; and
transmit the first location data to the WLAN device if the comparing indicates that the first location data is more current than the second location data.

14. The system of claim 13, wherein the first location data comprises at least one of the following: a current location estimate of the hybrid wireless device, ephemeris data of the global positioning satellites, and almanac data of the global positioning satellites.

15. The system of claim 13, wherein the first location data is associated with an Internet Protocol (IP) address of the hybrid wireless device.

16. The system of claim 13, wherein the WLAN device is a self-aware access point.

17. The system of claim 13, wherein the WLAN device is a self-aware mobile station.

18. The system of claim 13, wherein the second location data is associated with an Internet Protocol (IP) address of the WLAN device.

19. The system of claim 13, wherein the hybrid wireless device is further configured to:
update the first location data to a network including a location server.

20. The system of claim 13, wherein the WLAN device is to determine the second location data by executing an adaptive algorithm.

21. The system of claim 20, wherein the adaptive algorithm is to calculate the second location data based on any one or more of the following:
known or estimated locations of nearby self-aware network devices;
seed information from a location server;
user reported location to autonomously determine self location either by self calculation or with assistance of an external calculation;
computed time-difference-of-arrival triangulation of a burst of data transmission; and
center-of-mass estimation using a received signal strength indicator (RSSI) weighted range.

22. The system of claim 21, wherein the calculated second location data is stored internally within the WLAN device.

23. The system of claim 21, wherein the calculated second location data is continuously updated.

24. The system of claim 20, wherein the calculated second location data is autonomously communicated to other self-aware WLAN devices.

* * * * *